US011312324B2

(12) United States Patent
Kobayashi

(10) Patent No.: US 11,312,324 B2
(45) Date of Patent: Apr. 26, 2022

(54) ACCIDENT DETERMINATION DEVICE

(71) Applicant: PIONEER CORPORATION, Tokyo (JP)

(72) Inventor: Takayoshi Kobayashi, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 136 days.

(21) Appl. No.: 16/471,104

(22) PCT Filed: Nov. 7, 2017

(86) PCT No.: PCT/JP2017/040035
§ 371 (c)(1),
(2) Date: Jun. 19, 2019

(87) PCT Pub. No.: WO2018/116669
PCT Pub. Date: Jun. 28, 2018

(65) Prior Publication Data
US 2020/0017049 A1    Jan. 16, 2020

(30) Foreign Application Priority Data

Dec. 20, 2016    (JP) .............................. JP2016-246218

(51) Int. Cl.
*B60R 21/0132*    (2006.01)
*B60R 21/0136*    (2006.01)
(Continued)

(52) U.S. Cl.
CPC ...... *B60R 21/0132* (2013.01); *B60R 21/0134* (2013.01); *B60R 21/0136* (2013.01);
(Continued)

(58) Field of Classification Search
CPC .. B60R 2021/0027; B60R 2021/01322; B60R 21/00; B60R 21/0132; B60R 21/0134;
(Continued)

(56) References Cited

U.S. PATENT DOCUMENTS 7,359,782 B2 * 4/2008 Breed .................. G01S 7/0235
701/45
9,457,754 B1 * 10/2016 Christensen ........... B60Q 1/525
(Continued)

FOREIGN PATENT DOCUMENTS

GB         2374186 A        10/2002
JP        2001-266294 A     9/2001
(Continued)

OTHER PUBLICATIONS

JP2015221592A.English.translate (Year: 2015).*
(Continued)

*Primary Examiner* — B M M Hannan
(74) *Attorney, Agent, or Firm* — Procopio, Cory, Hargreaves & Savitch LLP

(57) ABSTRACT

An accident determination device which determines whether an accident has occurred in a moving object based on an impact having occurred in said moving object, comprising: an impact detecting unit that detects an impact having occurred in said moving object; an accident determining unit that compares impact value of the impact detected by said impact detecting unit with a determination threshold so as to determine whether an accident has occurred in said moving object; and a threshold setting unit that sets said determination threshold according to an area attribute of the area where said moving object is located.

7 Claims, 6 Drawing Sheets

(51) Int. Cl.
*G08G 1/13* (2006.01)
*B60R 21/0134* (2006.01)
*B60W 30/08* (2012.01)
*B60R 21/00* (2006.01)

(52) U.S. Cl.
CPC .............. *B60W 30/08* (2013.01); *G08G 1/13* (2013.01); *B60R 2021/0027* (2013.01)

(58) Field of Classification Search
CPC ... B60R 21/0136; B60W 30/08; B60W 30/00; B60W 60/00; B60W 30/16; B60W 60/0016; G08G 1/13; G08G 1/205; G08G 1/00; G01C 21/00; G01S 19/00
USPC ................................................ 701/32.2–32.5
See application file for complete search history.

(56) References Cited

U.S. PATENT DOCUMENTS

| | | | | |
|---|---|---|---|---|
| 9,773,281 | B1* | 9/2017 | Hanson | G06Q 40/08 |
| 10,354,230 | B1* | 7/2019 | Hanson | G07C 5/008 |
| 2004/0129478 | A1* | 7/2004 | Breed | B60N 2/0276 |
| | | | | 180/273 |
| 2005/0192727 | A1* | 9/2005 | Shostak | B60C 23/041 |
| | | | | 701/37 |
| 2008/0040004 | A1* | 2/2008 | Breed | B60R 21/0134 |
| | | | | 701/45 |
| 2009/0306857 | A1 | 12/2009 | Katz et al. | |
| 2010/0042296 | A1* | 2/2010 | Brandmeier | B60R 21/0132 |
| | | | | 701/46 |
| 2013/0030686 | A1* | 1/2013 | Morotomi | B60W 30/0953 |
| | | | | 701/301 |
| 2013/0090804 | A1* | 4/2013 | Oda | G07C 5/0841 |
| | | | | 701/32.3 |
| 2016/0052473 | A1* | 2/2016 | Debenham | B60R 21/0132 |
| | | | | 701/46 |
| 2016/0152208 | A1* | 6/2016 | Ewert | B60R 21/0134 |
| | | | | 701/46 |
| 2016/0203656 | A1* | 7/2016 | Bhogal | G07C 5/008 |
| | | | | 701/32.2 |
| 2016/0214609 | A1* | 7/2016 | Yamaoka | B60Q 9/00 |
| 2016/0364621 | A1* | 12/2016 | Hill | G06T 7/70 |
| 2018/0190044 | A1* | 7/2018 | Cappozza | G07C 5/0808 |

FOREIGN PATENT DOCUMENTS

| | | |
|---|---|---|
| JP | 2005-170073 A | 6/2005 |
| JP | 2007303857 A | 11/2007 |
| JP | 2011-133946 A | 7/2011 |
| JP | 2015-221592 A | 12/2015 |
| WO | 2005118348 A1 | 12/2005 |
| WO | 2009096827 A1 | 8/2009 |
| WO | 2014117915 A1 | 8/2014 |

OTHER PUBLICATIONS

International Search Report for related International Application No. PCT/JP2017/040035, dated Jan. 30, 2018; English translation provided; 3 pages.
Office Action for related JP App No. 2018557596 dated Apr. 21, 2020. English translation provided; 6 pages.
Extended European Search Report for related EP App. No. 17883738.1 dated Jul. 2, 2020; 7 pages.
Office Action dated Jul. 6, 2021 from corresponding JP Patent Application No. 2020-135622, 10 pages.

* cited by examiner

| PRIMARY ATTRIBUTE | ROAD | | | | NON ROAD | | |
|---|---|---|---|---|---|---|---|
| SECONDARY ATTRIBUTE | LOW SPEED WAY | ORDINARY ROAD | EXPRESS WAY | UNPAVED ROAD | PARKING SPACE | FERRY LANDING | OTHER |
| DETERMINATION THRESHOLD | THRESHOLD A | THRESHOLD B | THRESHOLD C | THRESHOLD D | THRESHOLD E | THRESHOLD F | THRESHOLD G |

| PRIMARY ATTRIBUTE | ROAD | | | | | | |
|---|---|---|---|---|---|---|---|
| CONGESTION ATTRIBUTE | CONGESTED | NOT CONGESTED | | | | | |
| ROAD SURFACE ATTRIBUTE | — | SNOW COVERED | | | NOT SNOW COVERED | | |
| WEATHER ATTRIBUTE (WIND, RAIN) | — | WEAK | INTER-MEDIATE | STRONG | WEAK | INTER-MEDIATE | STRONG |
| DETERMINING THRESHOLD | H | I | J | K | L | M | N |

| PRIMARY ATTRIBUTE | PARKING SPACE | | | | | |
|---|---|---|---|---|---|---|
| ROAD SURFACE ATTRIBUTE | SNOW COVERED | | | NOT SNOW COVERED | | |
| WEATHER ATTRIBUTE (WIND, RAIN) | WEAK | INTER-MEDIATE | STRONG | WEAK | INTER-MEDIATE | STRONG |
| DETERMINING THRESHOLD | O | P | Q | R | S | T |

FIG.7B

| WEATHER ATTRIBUTE (WIND, RAIN) | WEAK | INTER-MEDIATE | STRONG |
|---|---|---|---|
| SOUND-VOLUME THRESHOLD | (1) | (2) | (3) |

ACCIDENT DETERMINATION DEVICE

CROSS-REFERENCE TO RELATED APPLICATIONS

This application is a U.S. National Stage entry of PCT Application No: PCT/JP2017/040035 filed Nov. 7, 2017, which claims priority to Japanese Patent Application No. 2016-246218, filed Dec. 20, 2016, the contents of which are incorporated herein by reference.

TECHNICAL FIELD

The present invention relates to an accident determination device.

There has been proposed an accident notifying system that, if an accident occurs in a moving object such as a vehicle, automatically notifies the occurrence of the accident to a server. In this accident notifying system, for example, a terminal device mounted in a vehicle detects an impact having occurred in the vehicle and determines based on the detected magnitude of the impact (impact value) whether an accident has occurred. And if determining that an accident has occurred, the terminal device notifies the fact of accident occurrence and the site of occurrence of the accident to an external server via radio communication (e.g., Patent Document 1).

PRIOR ARTS LIST

Patent Document

Patent Document 1: Japanese Laid-Open Patent Publication No. 2001-266294

SUMMARY OF THE INVENTION

Problems to be Solved by the Invention

In the above conventional technique, when an impact having a magnitude greater than or equal to a predetermined threshold is detected, it is determined that an accident has occurred and is notified. However, in reality, even during normal travel, an impact occurs in a moving object, and its magnitude is different depending on irregularities in the road surface, a curve, the condition of inclination, and so on. Hence, there is the problem that it may be difficult to determine whether an accident has occurred, depending on the area where the moving object is located. Especially in parking spaces, accidents with relatively small impact tends to occur. Therefore, there is a problem that an accident cannot be detected if the same threshold is used in the parking space as on the road.

The problem that, with an accident determination device that determines whether an accident has occurred based on impacts having occurred in a moving object, it is difficult to appropriately determine according to attributes of the area where the moving object is located can be cited as an example of problems to be solved by the present invention.

Means to Solve the Problems

The invention according to claim 1 is an accident determination device which determines whether an accident has occurred in a moving object based on impact having occurred in the moving object, comprising: an impact detecting unit that detects an impact having occurred in the moving object; an accident determining unit that compares impact value of the impact detected by the impact detecting unit with a determination threshold so as to determine whether an accident has occurred in the moving object; and a threshold setting unit that sets the determination threshold according to an area attribute of the area where the moving object is located.

The invention according to claim 11 is an accident determination method which is executed by an accident determination device having an impact detecting means, comprising: a step of setting a determination threshold with which to determine whether an accident has occurred according to an area attribute of the area where a moving object is located; a step of detecting an impact having occurred in the moving object; and a step of comparing impact value of the impact detected and the determination threshold to determine whether an accident has occurred in the moving object.

The invention according to claim 12 is a program configured to cause a computer executing; a step of setting a determination threshold with which to determine whether an accident has occurred according to an area attribute of the area where a moving object is located; a step of detecting an impact having occurred in a moving object; and a step of comparing impact value of the impact detected and the determination threshold to determine whether an accident has occurred in the moving object.

BRIEF DESCRIPTIONS OF THE DRAWINGS

FIG. 2 is a flow chart showing the processing operation of an accident determining process of Embodiment 1;

FIG. 5 is a diagram showing schematically a threshold table of Embodiment 3;

FIGS. 7A and 7B are diagrams schematically showing threshold tables of Embodiment 4.

DESCRIPTION OF THE EMBODIMENTS

Figure 1:
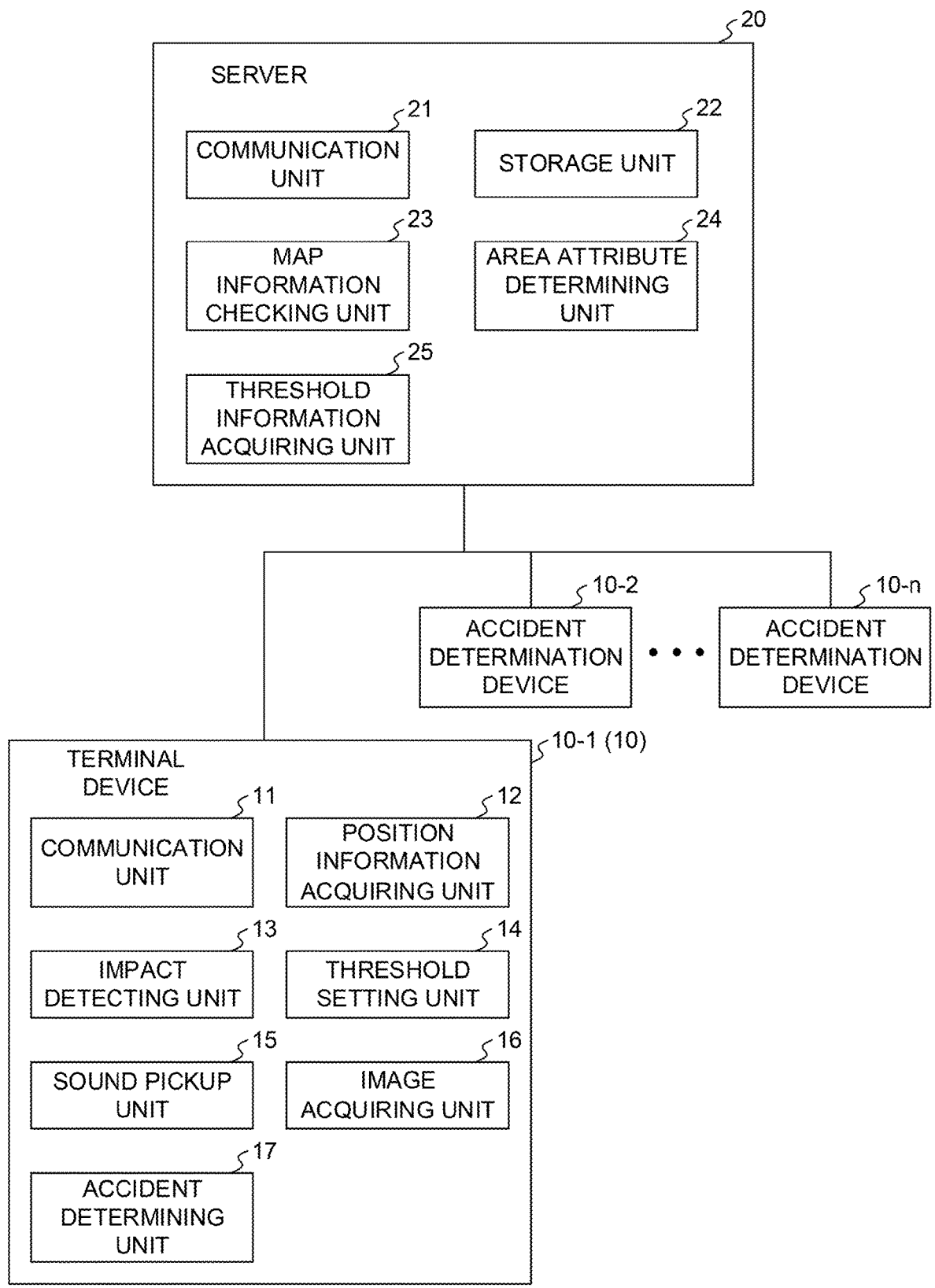
FIG. 1 is a block diagram showing the configurations of an accident determination device and a server of Embodiment 1.

Embodiments of the present invention will be described below with reference to the drawings. The same reference numerals are used to denote substantially the same or equivalent parts in the descriptions and accompanying drawings of the embodiments below.

FIG. 1 is a block diagram showing the configuration of an accident notifying system according to Embodiment 1. The accident notifying system is composed of a server 20 and a plurality of terminal devices 10-1 to 10-*n* (n is an integer of two or greater).

The accident determination device 10-1 to 10-*n* is, for example, a navigation device mounted in a moving object (hereinafter simply called a vehicle) such as a vehicle and performs radio communication with the server 20. The accident determination devices 10-1 to 10-*n* each have the same configuration, and hence these are generalized to the accident determination device 10, and the configuration and operation thereof will be described below.

The accident determination device 10 has a communication unit 11, a position information acquiring unit 12, an impact detecting unit 13, a threshold setting unit 14, a sound pickup unit 15, an image acquiring unit 16, and an accident determining unit 17.

The communication unit 11 transmits and receives information to and from the server 20. For example, the communication unit 11 transmits position information acquired by the position information acquiring unit 12 and receives threshold information that the accident determining unit 17 uses in accident determination. Further, the communication unit 11 may transmit image information of images around the moving object acquired by the image acquiring unit 16 to the server 20.

The position information acquiring unit 12 is constituted by, e.g., a GPS (Global Positioning System) sensor and acquires position information indicating the current position of the vehicle. For example, the position information acquiring unit 12 receives radio waves transmitted from a plurality of GPS satellites and calculates the distance from each GPS satellite based on the received radio waves to acquire position information.

The impact detecting unit 13 is constituted by, e.g., an acceleration sensor and detects the magnitude of an impact having occurred in the vehicle impact value G (hereinafter simply called impact value) based on a change in acceleration of the vehicle.

The threshold setting unit 14 sets a threshold that the accident determining unit 17 uses in accident determination based on threshold information acquired by the communication unit 11. The threshold that the accident determining unit 17 uses in accident determination includes a threshold for the magnitude of impact value (an impact threshold) and a threshold for the sound volume of an impact sound (a sound-volume threshold). In the present embodiment, the sound-volume threshold is set at a constant value, and the threshold setting unit 14 changes only the impact threshold based on threshold information transmitted from the server 20. Thus, in the description below, the impact threshold set by the threshold setting unit 14 (that is, the impact threshold that the accident determining unit 17 uses in accident determination) is called a "determination threshold". Note that in the present embodiment an impact threshold premised on the case where the moving object is on a road is set as the determination threshold for an initial state (state before changed).

The sound pickup unit 15 is constituted by a sound pickup device such as a microphone. The sound pickup unit 15 picks up an impact sound when the impact detecting unit 13 detects an impact.

The image acquiring unit 16 is constituted by an image pickup device such as an in-vehicle camera. The image acquiring unit 16 acquires images around the moving object at the time when the impact detecting unit 13 detects an impact. Further, the image acquiring unit 16 performs image recognition on the images around the moving object. By this means, if an obstacle is in the vicinity of the moving object, that obstacle is recognized by image recognition. If the area where the moving object is located is a parking space, signs or character strings placed at the entrance or the like of the parking space are recognized by image recognition. Thus, image information of the images around the moving object is transmitted to the server 20 via the communication unit 11, so that the server 20 can determine area attributes based on the image information.

The accident determining unit 17 determines whether an accident has occurred in the moving object based on the impact value of the impact detected by the impact detecting unit 13, the impact sound picked up by the sound pickup unit 15, and the images around the moving object acquired by the image acquiring unit 16. Specifically, the accident determining unit 17 determines whether the detected impact value is greater than or equal to the determination threshold (impact threshold) set by the threshold setting unit 14. Further, the accident determining unit 17 determines whether the sound volume of the impact sound is greater than or equal to the sound-volume threshold. Yet further, the accident determining unit 17 determines whether an obstacle such as a vehicle, a person, or a ground object existed in the vicinity of the moving object when an impact was detected based on the result of image recognition of the images around the moving object acquired by the image acquiring unit 16.

The accident determining unit 17 can determine whether an accident has occurred in the moving object using any of the determination based on the impact value, the determination based on the impact sound, and the determination based on the image information. Further, determination may be made by a combination of these. For example, if the impact value is greater than or equal to the determination threshold, and the sound volume of the impact sound is greater than or equal to the sound-volume threshold, or if the impact value is greater than or equal to the determination threshold, and the existence of an obstacle in the vicinity of the moving object is ascertained, then the accident determining unit 17 determines that an accident has occurred in the moving object.

The server 20 includes a communication unit 21, a storage unit 22, a map information checking unit 23, an area attribute determining unit 24, and a threshold information acquiring unit 25.

The communication unit 21 transmits and receives information to and from the accident determination device 10. For example, the communication unit 21 receives position information of the moving object from the accident determination device 10 and transmits threshold information to the accident determination device 10. Further, the communication unit 21 may receive image information of the images around the moving object from the accident determination device 10.

The storage unit 22 stores map information including the positions of roads and parking spaces. Further, the storage unit 22 stores information about impact thresholds set according to area attributes, as threshold information. In general, the moving speed of a moving object in a parking space is smaller than the moving speed of the moving object on a road, so that an accident with small impact is likely to occur in the parking place. Thus, the impact threshold in parking spaces is set at a lower value than the impact threshold in roads (that is, such that detection sensitivity is higher in parking spaces) in the threshold information.

The map information checking unit 23 reads out map information stored in the storage unit 22 and compares the read-out map information and the position information received by the communication unit 21. Thereby, the position on the map of the moving object is identified.

The area attribute determining unit 24 determines an attribute given to the area (that is, an area attribute of the area) where the moving object is located, based on the result of comparing by the map information checking unit 23. Specifically, in the present embodiment, the area attribute determining unit 24 determines whether the moving object is located on a road or in a parking space.

Further, when the communication unit 21 receives image information of the images around the moving object, the area attribute determining unit 24 can determine whether the moving object is located in a parking space based on the image information.

The threshold information acquiring unit 25 reads out corresponding threshold information from the storage unit 22 based on the area attribute determined by the area attribute determining unit 24 and supplies the threshold information to the communication unit 21.

Next, an example operation of an accident determining process executed by the accident determination device 10 and the server 20 will be described with reference to the flow chart of FIG. 2. In the following, an example processing operation will be described in which the server 20 determines the area attribute based on the result of comparing the position information of the moving object received from the accident determination device 10 with the map information, and in which the accident determining unit 17 performs accident determination by a combination of the determination based on the impact value, the determination based on the impact sound, and the determination based on the image information.

The position information acquiring unit 12 of the accident determination device 10 detects the position of the moving object and acquires position information (step S101). The communication unit 11 transmits the position information to the server 20 (step S102).

The communication unit 21 of the server 20 receives the position information of the moving object from the accident determination device 10. The map information checking unit 23 reads out map information stored in the storage unit 22, and checks the position information received by the communication unit 21 against the read-out map information (step S103).

The area attribute determining unit 24 determines the area attribute of the area where the moving object is located (whether the area is a road or a parking space), based on the result of checking by the map information checking unit 23 (step S104).

The threshold information acquiring unit 25 reads out threshold information corresponding to the area attribute determined by the area attribute determining unit 24 from the storage unit 22 to acquire. The communication unit 21 transmits the threshold information acquired by the threshold information acquiring unit 25 to the accident determination device 10 (step S105).

The communication unit 11 of the accident determination device 10 receives the threshold information from the server 20. The threshold setting unit 14 sets (changes) the determination threshold with which the accident determining unit performs accident determination based on the received threshold information (step S106). In the present embodiment, the threshold setting unit 14 sets an impact threshold indicated by the threshold information as the determination threshold.

The accident determining unit 17 determines whether the impact detecting unit 13 has detected an impact having impact value greater than or equal to the determination threshold (step S107). If not detected (No at step S107), the accident determining unit 17 waits for an impact being detected by the impact detecting unit 13.

If determining that the impact greater than or equal to the determination threshold has been detected (Yes at step S107), the accident determining unit 17 determines whether an impact sound greater than of equal to the sound-volume threshold has been detected by the sound pickup unit 15 or an obstacle has been detected in the images around the moving object by the image acquiring unit 16 (step S108).

If neither has been detected (No at step S108), the process returns to step S107, where the accident determining unit 17 waits again for an impact detected by the impact detecting unit 13.

If determining that either an impact sound greater than or equal to the sound-volume threshold or an obstacle has been detected (Yes at step S108), the accident determining unit 17 determines that an accident has occurred in the moving object. The communication unit 11 transmits an accident notification indicating that an accident is determined to have occurred in the moving object to the server 20 to notify the accident (step S109).

By the above processing operation, the accident determination device 10 and the server 20 perform the accident determining process.

In the accident notifying system of the present embodiment, the accident determination device 10 transmits position information of the moving object or image information of the images around the moving object to the server 20 and receives threshold information corresponding to the area attribute of the area where the moving object is located from the server 20 so as to perform accident determination. Thus, with the accident notifying system of the present embodiment, accident determination can be performed appropriately according to the area attribute of the area where the moving object is located.

Further, with the accident notifying system of the present embodiment, in addition to determination of whether the impact value is greater than or equal to the determination threshold, it is possible to determine whether the impact sound greater than or equal to the sound-volume threshold has been detected and whether an obstacle has been detected in the vicinity of the moving object to perform accident determination. Therefore, with the accident notifying system of the present embodiment, accident determination can be performed with the possibility of erroneous determination being reduced.

Embodiment 2

Figure 3:
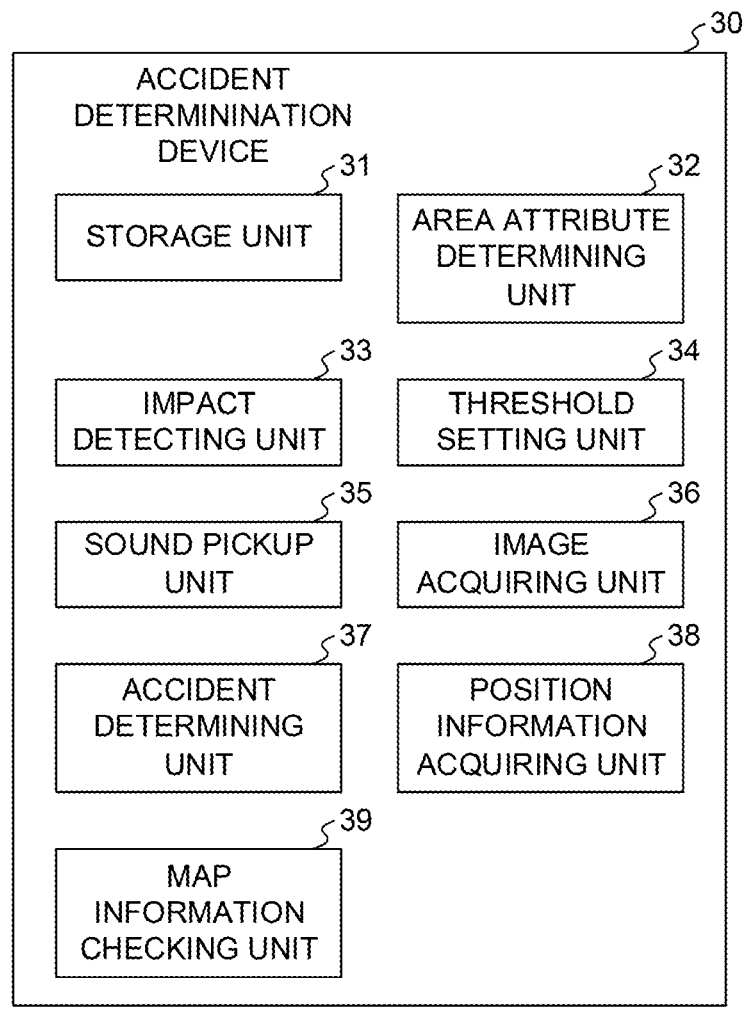
FIG. 3 is a block diagram showing the configuration of an accident determination device of Embodiment 2.

FIG. 3 is a block diagram showing the configuration of an accident determination device 30 of Embodiment 2. The accident determination device 30 of the present embodiment differs from the accident determination device 10 of Embodiment 1 in that the device 30 does not acquire threshold information by communicating with the server each time in performing accident determination but performs accident determination based on threshold information stored in its own storage unit.

The accident determination device 30 has a storage unit 31, an area attribute determining unit 32, an impact detecting unit 33, a threshold setting unit 34, a sound pickup unit 35, an image acquiring unit 36, an accident determining unit 37, a position information acquiring unit 38, and a map information checking unit 39.

The storage unit 31 stores information about impact thresholds set according to area attributes, as threshold information. As in Embodiment 1, the impact threshold in parking spaces is set at a lower value than the impact threshold in roads. Also, the storage unit 31 stores map information including the positions of roads and parking spaces.

The area attribute determining unit 32 determines whether the area where the moving object is located is a road or a parking space based on the result of image recognition of the images around the moving object acquired by the image acquiring unit 36. For example, if signs or character strings placed at the entrance of the parking space are recognized by image recognition, the area attribute determining unit 32 determines that the area where the moving object is located is a parking space. The area attribute determining unit 32 may determine whether the area where the moving object is located is a road or a parking space based on the result of checking position information against map information by the map information checking unit 39.

The impact detecting unit 33 is constituted by an acceleration sensor or the like and detects the impact value of the impact having occurred in the vehicle based on a change in acceleration of the vehicle.

The threshold setting unit 34 reads out threshold information stored in the storage unit 31 based on the area attribute determined by the area attribute determining unit 32 and sets the impact threshold corresponding to the read-out threshold information as the determination threshold. In the present embodiment, the sound-volume threshold is set at a constant value. Note that in the present embodiment an impact threshold premised on the case where the moving object is on a road is set as the determination threshold for an initial state (state before changed).

The sound pickup unit 35 is constituted by a sound pickup device such as a microphone and picks up an impact sound at the time an impact was detected by the impact detecting unit 33.

The image acquiring unit 36 is constituted by an image pickup device such as an in-vehicle camera and acquires images around the moving object at the time the impact was detected by the impact detecting unit 33. Further, the image acquiring unit 36 performs image recognition on the images around the moving object. On the basis of the result of this image recognition, the accident determining unit 37 determines whether an obstacle exists in the vicinity of the moving object. Further, the area attribute determining unit 32 determines the area attribute of the area where the moving object is located.

The accident determining unit 37 determines whether an accident has occurred in the moving object based on the impact value of the impact detected by the impact detecting unit 33, the impact sound picked up by the sound pickup unit 35, and the images around the moving object acquired by the image acquiring unit 36. The accident determining unit 37 may determine using any of the impact value, impact sound, and image information of the images around the moving object, or by a combination of these. For example, if the detected impact value is greater than or equal to the determination threshold (the impact threshold), and the sound volume of the impact sound is greater than or equal to the sound-volume threshold, or if the impact value is greater than or equal to the determination threshold, and the existence of an obstacle in the vicinity of the moving object is recognized by image recognition, then the accident determining unit 37 determines that an accident has occurred in the moving object.

The position information acquiring unit 38 acquires position information indicating the current position of the moving object as does the position information acquiring unit 12 of Embodiment 1.

The map information checking unit 39 reads out map information stored in the storage unit 31 and compares the read-out map information and the position information acquired by the position information acquiring unit 38, thereby identifying the position on the map of the moving object.

Figure 4:
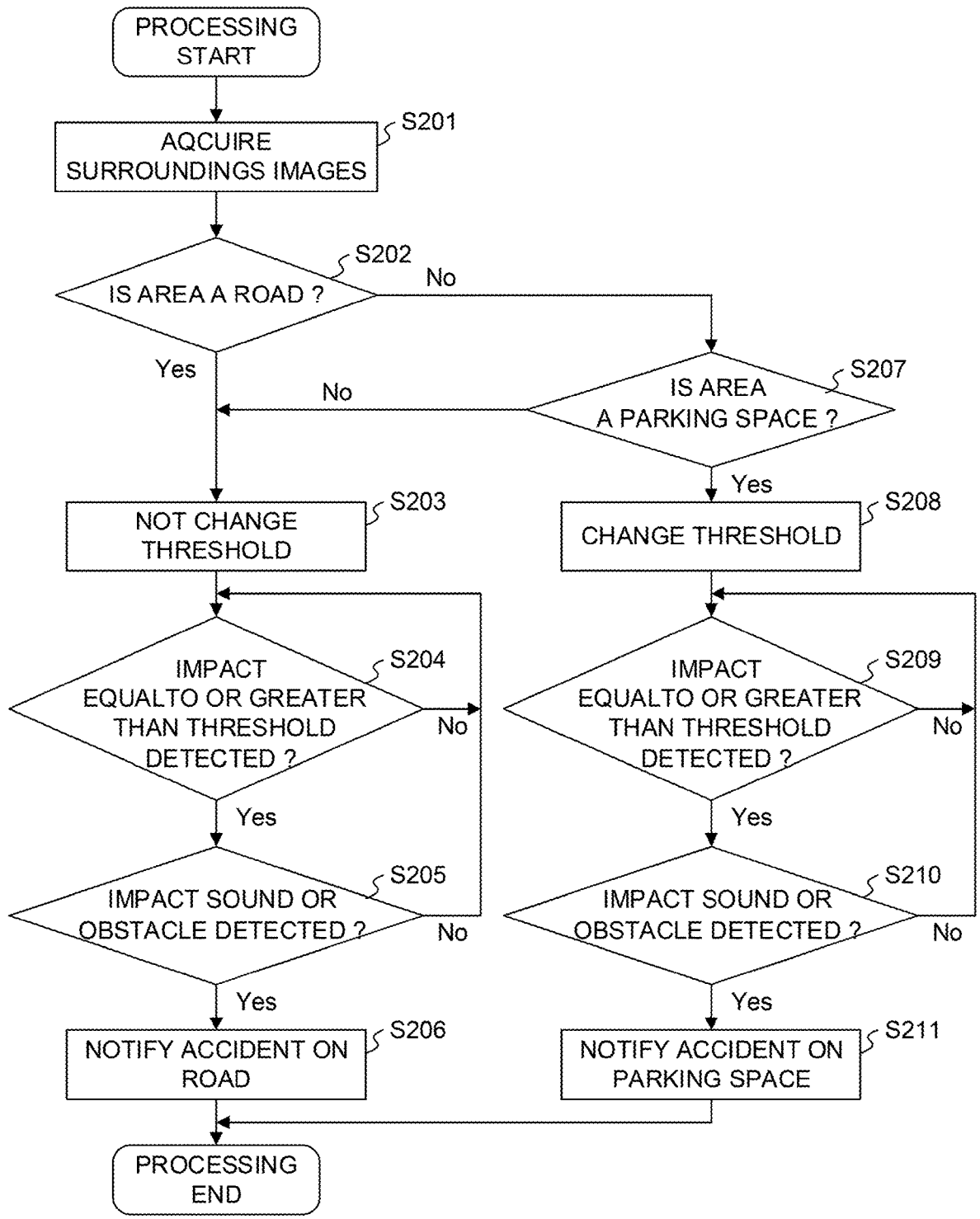
FIG. 4 is a flow chart showing the processing operation of an accident determining process of Embodiment 2.

Next, the operation of an accident determining process executed by the accident determination device 30 will be described with reference to the flow chart of FIG. 4. In the following, an example processing operation will be described in which the accident determination device 30 determines the area attribute based on the images around the moving object and in which the accident determining unit 37 performs accident determination by a combination of the determination based on the impact value, the determination based on the impact sound, and the determination based on image information.

The image acquiring unit 36 acquires the images around the moving object (step S201). The area attribute determining unit 32 determines whether the area where the moving object is located is a road or not based on the result of image recognition of the acquired images around the moving object (step S202).

If it is determined that the area where the moving object is located is a road (Yes at step S202), the threshold setting unit 34 maintains the previous determination threshold without changing the determination threshold (step S203).

The accident determining unit 37 determines whether an impact greater than or equal to the determination threshold has been detected by the impact detecting unit 33 (step S204). If determining that impact greater than or equal to the determination threshold has not been detected (No at step S204), the accident determining unit 37 waits for an impact being detected by the impact detecting unit 33.

If determining that the impact greater than or equal to the determination threshold has been detected (Yes at step S204), the accident determining unit 37 then determines whether the impact sound greater than or equal to the sound-volume threshold has been detected by the sound pickup unit 35 or whether an obstacle has been detected in the images around the moving object acquired by the image acquiring unit 36 (step S205). If neither has been detected (No at step S205), the process returns to step S204, where the accident determining unit 37 waits again for an impact being detected by the impact detecting unit 33.

If determining that either of the detection of an impact sound greater than or equal to the sound-volume threshold and the detection of an obstacle has happened (Yes at step S205), the accident determining unit 37 determines that an accident has occurred in the moving object on a road and notifies the accident (step S206).

On the other hand, if determining that the area where the moving object is located is not a road (No at step S202), the area attribute determining unit 32 determines whether the area where the moving object is located is a parking space or not (step S207).

If it is determined that the area where the moving object is located is a parking space (Yes at step S207), the threshold setting unit 34 reads out threshold information corresponding to the case where the moving object is located in a parking space from the storage unit 31 and changes the determination threshold set beforehand to an impact threshold corresponding to parking spaces (step S208).

The accident determining unit 37 determines whether the impact greater than or equal to the determination threshold has been detected by the impact detecting unit 33 (step S209). If determining not having been detected (No at step S209), the accident determining unit 37 waits for an impact being detected by the impact detecting unit 33.

If determining that the impact greater than or equal to the determination threshold has been detected (Yes at step S209), the accident determining unit 37 determines whether the impact sound greater than or equal to the sound-volume threshold has been detected by the sound pickup unit 35 or whether an obstacle has been detected in the images around the moving object acquired by the image acquiring unit 36 (step S210). If neither has been detected (No at step S210), the process returns to step S209, where the accident determining unit 37 waits again for an impact being detected by the impact detecting unit 33.

If determining that either of the detection of an impact sound greater than or equal to the sound-volume threshold and the detection of an obstacle has happened (Yes at step S210), the accident determining unit 37 determines that an accident has occurred in the moving object in a parking space and notifies the accident (step S211).

By the above processing operation, the accident determination device 30 performs the accident determining process.

The accident determination device 30 of the present embodiment stores impact thresholds corresponding to area attributes, determines the attribute of the area where the moving object is located by image recognition, and sets the corresponding impact threshold as the determination threshold. Therefore, with the accident determination device 30 of the present embodiment, an appropriate determination threshold can be selected according to the attribute of the area where the moving object is located, to perform accident determination.

Embodiment 3

An accident notifying system of the present embodiment has the same configuration as the accident notifying system of Embodiment 1 and differs from the accident notifying system of Embodiment 1 in threshold information stored in the storage unit 22 of the server 20 and the type of area attribute determined by the area attribute determining unit 24.

The area attribute determining unit 24 determines the primary attribute and secondary attribute of the area where the moving object is located, based on the result of comparing map information and position information by the map information checking unit 23. For example, the area attribute determining unit 24 determines whether the area where the moving object is located is a road or a place other than a road (a non-road), for the primary attribute of the area. Then the area attribute determining unit 24 determines whether the road is an unpaved road, an expressway, a low-speed way such as a zone 30, or a road other than those (called an ordinary road), for the secondary attribute. The area attribute determining unit 24 may determine further for the secondary attribute of roads whether a bump exists on the road, whether a difference in level exists between the road and a sidewalk, whether an intersection exists, whether a store entrance exists, whether a sharp curve exists, whether the road slopes and curves, and so on. As to a non-road area, the area attribute determining unit 24 determines whether that area is a parking space, a ferry landing, or another area for the secondary attribute.

The storage unit 22 stores map information including locations of low-speed ways, ordinary roads, expressways, unpaved roads, parking spaces, ferry landings, bumps on roads, spots with a difference in level between a road and a sidewalk, intersections, store entrances, sharp curves, spots where the road slopes and curves, so on. Further, the storage unit 22 stores thresholds to be used by the accident determination device 10 in accident determination based on impact values, as threshold information corresponding to area attributes.

FIG. 5 presents a threshold table stored in the storage unit 22 that shows an example of the impact threshold for each area attribute. In this table, impact thresholds corresponding to a low-speed way, an ordinary road, an expressway, an unpaved road, a parking space, a ferry landing, and the other non-road areas from among the above plurality of places (area attributes), are extracted and shown. A threshold A for a low-speed way, a threshold B for an ordinary road, a threshold C for an expressway, a threshold D for an unpaved road, a threshold E for a parking space, a threshold F for a ferry landing, and a threshold G for the other non-road areas, are stored as impact thresholds corresponding to the area attributes in the storage unit 22.

The movement speed of a moving object is smaller on a low-speed way than on an ordinary road and greater on an expressway than on an ordinary road. Thus, the impact threshold for a low-speed way is set at a lower value than the impact threshold for an ordinary road (that is, such that the sensitivity of detection is higher), the impact threshold for an expressway is set at a higher value than the impact threshold for an ordinary road (that is, such that the sensitivity of detection is lower) (threshold A<threshold B<threshold C). Since an unpaved road is rougher in road surface than an ordinary road, it is assumed that erroneous detection more often happens. Thus, in order to prevent erroneous detection, the impact threshold for an unpaved road is set at a higher value than the impact threshold for an ordinary road (that is, such that the sensitivity of detection is lower) (threshold D>threshold B). In a parking space, the movement speed of a moving object is smaller than on a road. Thus, the impact threshold for a parking space is set at a lower value than the impact threshold for a road (that is, such that the sensitivity of detection is higher) (threshold E<threshold B). In a ferry landing, the impact that occurs in a moving object while it is getting on or off a ferry is large, and hence it is assumed that erroneous detection more often happens. Thus, in order to prevent erroneous detection, the impact threshold for a ferry landing is set at a higher value than the impact threshold for a road (that is, such that the sensitivity of detection is lower) (threshold F>threshold B).

The threshold information acquiring unit 25 acquires threshold information denoting the impact threshold for the corresponding area attribute from among threshold information stored in the storage unit 22 according to the area attribute determined by the area attribute determining unit 24. The communication unit 21 transmits the threshold information acquired by the threshold information acquiring unit 25 to the accident determination device 10.

The threshold setting unit 14 of the accident determination device 10 sets (or changes) the determination threshold based on the threshold information received from the server 20 via the communication unit 11. The accident determining unit 17 performs accident determination based on the set determination threshold.

The accident notifying system of the present embodiment determines not only whether the area where the moving object is located is a road or a parking space but the area attribute further categorized into details to set the threshold. Therefore, since one of impact thresholds categorized into details can be selected to set the determination threshold, accident determination can be performed more appropriately according to the area where the moving object is located.

Further, the present embodiment can be applied to an accident determination device having the same configuration as in Embodiment 2. For example, the storage unit 31 of the accident determination device 30 stores map information including locations of low-speed ways, ordinary roads, expressways, unpaved roads, parking spaces, ferry landings, bumps on roads, spots with a difference in level between a road and a sidewalk, intersections, store entrances, sharp curves, spots where the road slopes and curves, so on, and threshold information corresponding to these locations; the area attribute determining unit 32 determines the area attribute based on the result of comparing position information and the map information; and the threshold setting unit 34 sets the threshold corresponding to the area attribute as the determination threshold, so that the accident determination device 30 of Embodiment 2 can perform accident determination according to the area attribute categorized into details as in the present embodiment.

Embodiment 4

Figure 6:
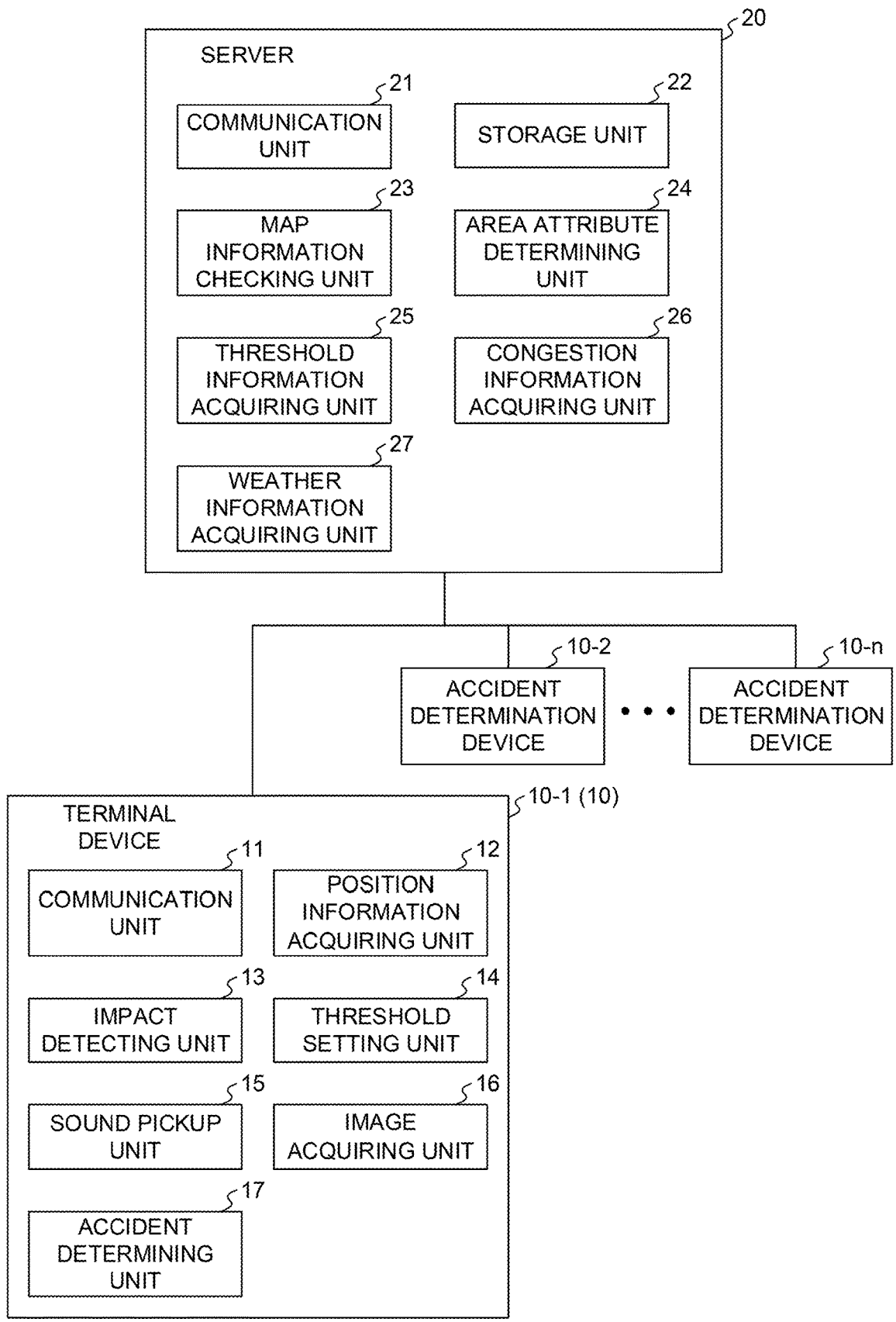
FIG. 6 is a block diagram showing the configurations of an accident determination device and a server of Embodiment 4.

FIG. 6 is a block diagram showing the configuration of an accident notifying system of Embodiment 4. The accident notifying system of the present embodiment is composed of a server 20 and a plurality of accident determination devices 10-1 to 10-*n* (accident determination devices 10) as in Embodiment 1. The accident notifying system of the present embodiment differs from the accident notifying system of Embodiment 1 in that the server 20 has a congestion information acquiring unit 26 and a weather information acquiring unit 27 and in the contents of threshold information stored in the storage unit 22 of the server 20.

Further, the accident notifying system of the present embodiment differs from the accident notifying system of Embodiment 1 in that the accident determining unit 17 of the accident determination device 10 changes the sound-volume threshold as well as the impact threshold as the determination threshold according to the area attribute.

The congestion information acquiring unit 26 of the server 20 acquires real-time congestion information of each road link for roads contained in the map information stored in the storage unit 22 from an external device (not shown) via the communication unit 21.

The weather information acquiring unit 27 acquires real-time weather information of each area from an external device via the communication unit 21. The weather information contains information about the strength of wind and rain and the presence/absence of deposited snow.

The area attribute determining unit 24 determines the primary attribute and secondary attribute of the area where the moving object is located based on the result of comparing the map information and position information by the map information checking unit 23, the congestion information acquired by the congestion information acquiring unit 26, and the weather information acquired by the weather information acquiring unit 27.

Specifically, the area attribute determining unit 24 determines whether the area where the moving object is located is a road or a parking space, for the primary attribute of the area attribute. Further, the area attribute determining unit 24 determines whether the road where the moving object is located is congested, for a congestion attribute that is one secondary attribute of the area attribute. Yet further, the area attribute determining unit 24 determines whether the area where the moving object is located is covered with snow, for a road surface attribute that is one secondary attribute of the area attribute. Still further, the area attribute determining unit 24 determines the strength of wind and rain in the area where the moving object is located, for a weather attribute that is one secondary attribute of the area attribute.

The storage unit 22 stores impact thresholds to be used in accident determination by the accident determination device 10 as threshold information corresponding to area attributes including the primary attribute, congestion attribute, road surface attribute, and weather attribute.

FIG. 7 (*a*) presents a threshold table stored in the storage unit 22 that shows an example of the impact threshold for each area attribute. A threshold H is stored as the impact threshold for the case where the road is congested. As the impact threshold for the case where the road is covered with snow (a snow covered road), a threshold I is stored for the case where wind and rain are weak; a threshold J for the case where wind and rain are intermediate in strength; and a threshold K for the case where wind and rain are strong. As the impact threshold for the case where the road is not covered with snow (a snow non-covered road), a threshold L is stored for the case where wind and rain are weak; a threshold M for the case where wind and rain are intermediate in strength; and a threshold N for the case where wind and rain are strong. As the impact threshold for the case where the parking space is covered with snow (a snow covered parking space), a threshold O is stored for the case where wind and rain are weak; a threshold P for the case where wind and rain are intermediate in strength; and a threshold Q for the case where wind and rain are strong. As the impact threshold for the case where the parking space is not covered with snow (a snow non-covered parking space), a threshold R is stored for the case where wind and rain are weak; a threshold S for the case where wind and rain are intermediate in strength; and a threshold T for the case where wind and rain are strong.

In congestion, since the movement speed of a moving object is lower, an accident with a small impact is likely to occur. Thus, in the threshold table, for a congested road, the impact threshold is set at a lower value than the impact threshold for a non-congested road (that is, such that the sensitivity of detection is higher). When covered with snow, since the road surface is rougher than when not covered with snow, it is assumed that erroneous detection often happens. Thus, in order to prevent erroneous detection, for a snow covered road, the impact threshold is set at a higher value than the impact threshold for a snow non-covered road (that is, such that the sensitivity of detection is lower). Likewise, for a snow covered parking space, the impact threshold is set at a higher value than the impact threshold for a snow non-covered parking space. When wind and rain are strong, since the movement speed of a moving object is smaller than when wind and rain are weak, an accident with a small impact is likely to occur. Thus, for when wind and rain are strong, the impact threshold is set at a lower value than the impact threshold for when wind and rain are weak (threshold I>threshold J>threshold K, threshold L>threshold M>threshold N, threshold O>threshold P>threshold Q, threshold R>threshold S>threshold T).

The storage unit 22 stores sound-volume thresholds to be used in accident determination by the accident determination device 10 as threshold information corresponding to the weather attribute that is one secondary attribute of the area attribute.

FIG. 7 (*b*) presents a threshold table stored in the storage unit 22 that shows an example of the sound-volume threshold for each weather attribute. A threshold (1) is stored as the sound-volume threshold for the case where wind and rain are weak; a threshold (2) as the sound-volume threshold for the case where wind and rain are intermediate in strength; and a threshold (3) as the sound-volume threshold for the case where wind and rain are strong. When wind and rain are strong, since the sound pickup unit 15 picks up more noise, it is assumed that erroneous detection often happens. Thus, in order to prevent erroneous detection, the sound-volume threshold is set at a greater value as wind and rain become stronger (that is, such that the sensitivity of detection becomes lower) (that is, threshold (1)<threshold (2)<threshold (3)).

The threshold information acquiring unit 25 acquires threshold information denoting the impact threshold and sound-volume threshold for the corresponding area attribute from among threshold information stored in the storage unit 22 according to determination of the area attribute determining unit 24. For example, if the area where the moving object is located is a snow covered road, and wind and rain are strong, then threshold information denoting threshold K as the impact threshold and threshold (3) as the sound-volume threshold is acquired. The communication unit 21 transmits the threshold information acquired by the threshold information acquiring unit 25 to the accident determination device 10.

The threshold setting unit 14 of the accident determination device 10 sets (changes) the impact threshold and sound-volume threshold as the determination threshold based on the threshold information acquired by the communication unit 11. Note that the threshold setting unit 14 can change the impact threshold and the sound-volume threshold independently of each other. The accident determining unit 17 performs accident determination based on the set impact threshold and sound-volume threshold.

The accident notifying system of the present embodiment sets the determination threshold based on the congestion attribute indicating whether congestion exists, the road surface attribute indicating whether snow is deposited, and the weather attribute indicating the strength of wind and rain as well as the primary attribute indicating whether the area where the moving object is located is a road or a parking space. Further, not only the impact threshold but also the sound-volume threshold can be changed according to the area attribute. Therefore, a threshold can be selected according to the situation in which the moving object is, to perform accident determination appropriately.

Embodiments of the present invention are not limited to what are shown by the above embodiments 1 to 4. For example, the above embodiments 1, 3, and 4 describe the configuration where the accident determination device 10 receives threshold information from the server 20 and sets the determination threshold based on the received threshold information. However, a configuration may be made in which the accident determination device 10 stores pieces of threshold information in the storage unit beforehand, receives information about the area attribute, not threshold information, from the server 20, and sets the determination threshold based on threshold information stored in its own storage unit.

Further, the above embodiment 4 describes the configuration where the sound-volume threshold for an impact sound is changed according to the weather attribute indicating the strength of wind and rain. However, a configuration may be made in which the sound-volume threshold is changed according to an area attribute other than the weather attribute (e.g., whether the area is a road or a parking space). In this case, the impact threshold and the sound-volume threshold as the determination threshold can be changed independently of each other.

Yet further, the above embodiment 3 describes the configuration where the road surface state and the congestion situation are determined for the area attribute of the area where the moving object is located so as to change the determination threshold. However, a configuration may be made in which additionally speed information of the moving object is acquired so as to change the threshold according to a combination of the area attribute and the speed information. The speed information can be acquired, for example, by providing a vehicle speed sensor in the accident determination device and acquiring a vehicle speed pulse signal from the ECU (Engine Control Unit) of the vehicle that is the moving object to calculate the vehicle speed.

The above embodiments can be used in combination as needed. For example, the above embodiments 3 and 4 may be combined to form a configuration where the area attribute is further determined into details to set the threshold.

A series of processes described in the above embodiments can be executed by computer processing according to a program stored in a recording medium such as a ROM.

The invention claimed is:

1. An accident determination device which determines whether an accident has occurred in a moving object based on impact having occurred in said moving object, comprising:
a first sensor that detects an impact having occurred in said moving object;
a processor that compares impact value of the impact detected by said first sensor with a determination threshold so as to determine whether an accident has occurred in said moving object;
the processor that sets said determination threshold according to an area attribute of an area where said moving object is located, wherein, when the area attribute of the area where said moving object is located indicates a parking space, said processor sets said determination threshold to be at a lower value than when said area attribute indicates a road; and
a second sensor that acquires position information indicating a position of said moving object;
the processor that communicates with an external device, wherein said processor transmits said position information to said external device and receives threshold information indicating an impact threshold according to the area attribute of the area where said moving object is located from said external device,
the processor providing a notification to an the external device of a determination that the accident has occurred based on the impact threshold, and
wherein said processor sets said determination threshold based on said threshold information.

2. An accident determination device which determines whether an accident has occurred in a moving object based on an impact having occurred in said moving object, comprising:
a sensor that detects an impact having occurred in said moving object;
a processor that compares impact value of the impact detected by said sensor with a determination threshold so as to determine whether an accident has occurred in said moving object;
the processor that sets said determination threshold according to an area attribute of an area where said moving object is located,
wherein said area attribute includes a primary attribute indicating whether the area is a road or not and a secondary attribute indicating whether the road is an expressway or an ordinary road when said primary attribute indicates a road, and
wherein, when said secondary attribute indicates an expressway, said processor sets said determination threshold to be at a higher value than when said secondary attribute indicates an ordinary road; and a second sensor that acquires position information indicating a position of said moving object; and the processor that communicates with an external device, wherein said processor transmits said position information to said external device and receives threshold information indicating an impact threshold according to the area attribute of the area where said moving object is located from said external device, the processor providing a notification to an the external device of a determination that the accident has occurred based on the impact threshold, and wherein said processor sets said determination threshold based on said threshold information.

3. An accident determination device which determines whether an accident has occurred in a moving object based on an impact having occurred in said moving object, comprising:

a sensor that detects an impact having occurred in said moving object;

a processor that compares impact value of the impact detected by said sensor with a determination threshold so as to determine whether an accident has occurred in said moving object;

the processor that sets said determination threshold according to an area attribute of an area where said moving object is located, wherein said area attribute includes a primary attribute indicating whether the area is a road or not and a secondary attribute indicating whether the road surface is covered with snow or non-covered with snow when said primary attribute indicates a road, and wherein, when said secondary attribute indicates being covered with snow, said processor sets said determination threshold to be at a higher value than when said secondary attribute indicates being non-covered with snow; and a second sensor that acquires position information indicating a position of said moving object; and the processor that communicates with an external device, wherein said processor transmits said position information to said external device and receives threshold information indicating an impact threshold according to the area attribute of the area where said moving object is located from said external device, the processor providing a notification to an the external device of a determination that the accident has occurred based on the impact threshold, and wherein said processor sets said determination threshold based on said threshold information.

4. An accident determination device which determines whether an accident has occurred in a moving object based on an impact having occurred in said moving object, comprising:

a first sensor that detects an impact having occurred in said moving object;

a processor that compares impact value of the impact detected by said sensor with a determination threshold so as to determine whether an accident has occurred in said moving object;

the processor that sets said determination threshold according to an area attribute of an area where said moving object is located, wherein said area attribute includes a primary attribute indicating whether the area is a road or not and a secondary attribute indicating whether that road is a low-speed way or an ordinary road when said primary attribute indicates a road, and wherein, when said secondary attribute indicates a low-speed way, said processor sets said determination threshold to be at a lower value than when said secondary attribute indicates an ordinary road; and a second sensor that acquires position information indicating a position of said moving object; and the processor that communicates with an external device, wherein said processor transmits said position information to said external device and receives threshold information indicating an impact threshold according to the area attribute of the area where said moving object is located from said external device, the processor providing a notification to an the external device of a determination that the accident has occurred based on the impact threshold, and wherein said processor sets said determination threshold based on said threshold information.

5. An accident determination device which determines whether an accident has occurred in a moving object based on an impact having occurred in said moving object, comprising:

a first sensor that detects an impact having occurred in said moving object;

a processor that compares impact value of the impact detected by said sensor with a determination threshold so as to determine whether an accident has occurred in said moving object; and the processor that sets said determination threshold according to an area attribute of an area where said moving object is located, wherein, when the area attribute of the area where said moving object is located indicates a ferry landing, said processor sets said determination threshold to be at a higher value than when said area attribute indicates a road; and a second sensor that acquires position information indicating a position of said moving object; and the processor that communicates with an external device, wherein said processor transmits said position information to said external device and receives threshold information indicating an impact threshold according to the area attribute of the area where said moving object is located from said external device, the processor providing a notification to an the external device of a determination that the accident has occurred based on the impact threshold, and wherein said processor sets said determination threshold based on said threshold information.

6. An accident determination method which is executed by an accident determination device having a sensor, comprising:

a step of setting a determination threshold with which to determine whether an accident has occurred according to an area attribute of the area where a moving object is located;

a step of detecting an impact having occurred in said moving object;

a step of comparing impact value of said impact detected and said determination threshold to determine whether an accident has occurred in said moving object;

wherein, in the step of setting the determination threshold, when the area attribute of an area where said moving object is located indicates a parking space, said determination threshold is set to be at a lower value than when said area attribute indicates a road; and a step of acquiring position information indicating a position of said moving object; and a step of communicating with an external device, wherein a processor transmits said position information to said external device and receives threshold information indicating an impact threshold according to the area attribute of the area where said moving object is located from said external device, the processor providing a notification to an the external device of a determination that the accident has occurred based on the impact threshold, and wherein said processor sets said determination threshold based on said threshold information.

7. A non-transitory computer-readable storage medium storing a program configured to cause a computer executing:

a step of setting a determination threshold with which to determine whether an accident has occurred according to an area attribute of an area where a moving object is located;

a step of detecting an impact having occurred in a moving object; and a step of comparing impact value of said impact detected and said determination threshold to determine whether an accident has occurred in said moving object;

wherein, in the step of setting the determination threshold, when the area attribute of the area where said moving object is located indicates a parking space, said determination threshold is set to be at a lower value than when said area attribute indicates a road;

acquiring position information indicating a position of said moving object; and communicating with an external device, wherein a processor transmits said position information to said external device and receives threshold information indicating an impact threshold according to the area attribute of the area where said moving object is located from said external device, the processor providing a notification to an the external device of a determination that the accident has occurred based on the impact threshold, and wherein said processor sets said determination threshold based on said threshold information.

\* \* \* \* \*